United States Patent Office 3,426,025
Patented Feb. 4, 1969

3,426,025
CATALYSTS FOR PREPARING CARBODIIMIDES
Kenneth C. Smeltz, Wilmington, Del., assignor to E. I. du Pont de Nemours and Company, Wilmington, Del., a corporation of Delaware
No Drawing. Filed Nov. 28, 1961, Ser. No. 155,470
U.S. Cl. 260—288       8 Claims
Int. Cl. C07d 33/52, 31/40; C07c 119/02

ABSTRACT OF THE DISCLOSURE

Preparing carbodiimides by heating from 100° C. to 250° C. under anhydrous conditions,
(A) an organic isocyanate containing 1 to 3 isocyanate groups such as one to three ring carbocyclic aromatic isocyanates, saturated aliphatic isocyanate with two to eighteen carbons in the aliphatic group, pyridine isocyanate and quinoline isocyanates, the isocyanates being free of Zerewitinoff active hydrogen, and
(B) an organo-metallic catalyst such as tetraisopropyl titanate, tetrakis(2-ethylhexyl)titanate, tetraoctyl zirconate, tetraisopropyl zirconate or penaethyl niobiate.

---

This invention relates to a novel process for the preparation of carbodiimides. More particularly this invention relates to a novel catalytic process of preparing carbodiimides from isocyanates.

Carbodiimides are compounds containing the group —N=C=N—. They have a variety of uses, e.g., they are useful as catalysts for converting alcohols and acids to esters, for converting acids and amines to amides such as polypeptides and as intermediates for preparing isourea ethers, guanidines, ureas and the like. Polycarbodiimides, prepared from polyisocyanates, are also useful for preparing films, fibers and the like.

The older methods for preparing carbodiimides are rather laborious and of limited applicability. A well-known method involves reacting thioureas with mercuric oxide or the like to form the carbodiimide, mercuric sulfide and water, i.e.

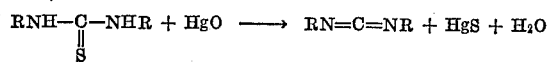

Another method involves the reaction of organic isocyanates with phosphine-imines to form carbodiimides, i.e.

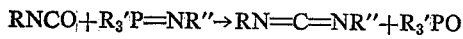

Unfortunately, the phosphine-imines are somewhat laborious to prepare. A more convenient method involves conversion of isocyanates to carbodiimides in the presence of certain pholines or phospholine oxides, e.g.

This method gives carbodiimides in excellent yields but has the disadvantage that the catalysts are rather difficult to prepare in commercial practice.

It is an object of this invention to provide a new process for the production of carbodiimides. A further object is to provide new catalysts for carbodiimide production. A still further object is to provide catalysts useful with all types of isocyanates for carbodiimide production. Other objects will appear hereinafter.

These and other objects of this invention are accomplished by the process of preparing organic carbodiimides which comprises heating an organic isocyanate and an organometallic catalyst together in the range of from about 100° C. to about 250° C., the catalyst being a metallic derivative of an organic hydroxy compound. The catalytic reaction evolves carbon dioxide which can be used as a guide to regulate the reaction. Optionally an organic solvent can be used for the reaction as long as the solvent is free of Zerewitinoff active hydrogen.

In carrying out the process of the present invention, any organic isocyanate, including monoisocyanates and polyisocyanates, may be used, such as aromatic, aliphatic or cycloaliphatic types. These organic isocyanates may contain other substituents; however, it is readily apparent that these substituents should not be reactive with the isocyanate group or groups. Therefore, they should not be of the active hydrogen-containing type which display activity according to the Zerewitinoff test. The isocyanates can contain from one to three isocyanate groups.

The catalysts useful in the present invention are all derivatives of metals. They have the formula $M(OR)_y$, and are the metallic derivatives of organic hydroxy compounds, i.e., alcohols and phenols. R may be an alkyl group, for example methyl, ethyl, propyl, butyl, isopropyl, hexyl, octyl, decyl, dodecyl and the like, or aromatic groups like phenyl, chlorophenyl, nitrophenyl or alkylphenyl. M is a metal chosen from lithium, sodium, potassium, boron, titanium, hafnium, zirconium, niobium and silicon. The subscript $y$ is the valence of the element M, i.e., 1 for lithium, sodium, potassium, 3 for boron, and 4 for titanium, zirconium, silicon and hafnium and 5 for niobium. The method of preparing these catalysts varies with the particular element involved. For example, the derivatives of lithium, sodium and potassium can generally be prepared by reacting the element with ROH (with some caution with potassium). If R is aromatic, i.e., ROH is a phenol and therefore acidic, the derivatives can be prepared by neutralization with the metal hydroxide. The derivatives of boron, silicon and the like are prepared by the well known reaction of ROH with the chlorides of the elements, i.e., $BCl_3$, $SiCl_4$ and the like. The catalysts $M(OR)_y$ must, of course, be free of excess ROH and water. Of the aforementioned group, the preferred catalysts are those derived from titanium, niobium and zirconium and, particularly, tetraoctyl zirconate, pentaethyl niobiate and tetraisopropyl titanate. These catalysts work best at temperatures in excess of 140° C. The preferred temperature is about 180° C.

The catalyst concentration is not critical but does have an effect on the rate of the reaction of the present process. With the preferred catalyst, tetraoctyl zirconate, at the preferred temperature, 180° C., concentrations as low as 0.25 mole percent based on the isocyanate, give useful reaction rates. Lower concentrations will catalyze the reaction at a slower rate. It is unlikely that a catalyst concentration below 0.1 mole percent would be of interest, however. Higher catalyst concentrations are useful with some of the less efficient catalysts. There is no need for any of the catalyst concentrations to exceed 10 mole percent of the isocyanate however.

The catalysts of this invention are useful for converting isocyanates to carbodiimides only in the temperature range indicated. At lower temperatures, say room temperature, most of these same catalysts cause isocyanates to trimerize to the 2,4,6-triketohexahydro-1,3,5-triazines. Also, at lower temperatures, these catalysts have a tendency to convert any carbodiimide formed to dimers (2,4-diimino-1,3-diazetidines) and trimers (2,4,6-triiminohexahydro-1,3,5-triazines). The dimerization and trimerization appear to be reversible and are effectively prevented by operating at higher temperatures. It is necessary, however, to find by tests which temperature is most effective with any particular catalyst and isocyanate. It is, of course, understood that a particular set of reaction conditions will be preferred for each combination of catalyst and isocyanate and that it is impossible to delineate all such information here.

It is indicated above that the solvent, if used, and catalysts must be free of Zerewitinoff active hydrogen. A compound which contains Zerewitinoff active hydrogen reacts with methyl magnesium halide (methyl Grignard reagent) to form methane. This is the basis of the well-known Zerewitinoff test which is more fully described in "Quantitative Organic Analysis" by Niederl and Niederl (Wiley, New York, 2nd ed., p. 263 ff.). It is well known that organic isocyanates containing Zerewitinoff hydrogen cannot be prepared for they would react among themselves. Thus isocyanates containing free hydroxyl, carboxyl, mercapto, amino (containing NH), sulfonic acid, amide (containing NH), sulfonamido (containing NH) and most aliphatic nitro groups are unavailable in theory and therefore cannot be used in this invention. The aromatic isocyanates which are useful in this invention are, in general, derivatives of benzene, naphthalene, anthracene, phenanthrene, pyridine, quinoline and the like. Derivatives of benzene and naphthalene are preferred because they are more readily available. These aromatic isocyanate molecules may contain substituents such as halogen, alkoxyl groups, carboalkoxy groups, nitrile groups, nitro groups, alkyl groups and the like which are unreactive toward isocyanate groups. The aliphatic isocyanates which are useful in this invention are any of those obtained from aliphatic amines which are free from groups which react with isocyanate groups. In general, they may contain alkoxyl groups, carboalkoxy groups, nitrile groups, dialkylamino groups and the like. In general, halogenated aliphatic isocyanates are not readily available although some are known and may be used. Of course, these restrictions apply to both acyclic and cyclic aliphatic isocyanates.

Some useful examples of isocyanates are: phenyl isocyanate, o-phenyl diisocyanate, m-phenyldiisocyanate, p-phenyl diisocyanate, 1,3,5-phenyl triisocyanate, o-tolyl isocyanate, m-tolyl isocyanate, p-tolyl isocyanate, other similar alkylphenyl isocyanates containing ethyl, propyl groups etc., o-methoxyphenyl isocyanate, m-methoxyphenyl isocyanate, p-methoxyphenyl isocyanate, similar alkoxyphenyl isocyanates containing ethyl, propyl and like groups, o-chlorophenyl isocyanate, m-chlorophenyl isocyanate, p-chlorophenyl isocyanate, the corresponding bromine derivatives, o-nitrophenyl isocyanate, m-nitrophenyl isocyanate, p-nitrophenyl isocyanate, haloalkylphenyl isocyanates such as 3-chloro-2-methylphenyl isocyanate and similar isomeric compounds, alkylnitrophenyl isocyanates such as 4-methyl-3-nitrophenyl isocyanate and similar compounds, alkylphenyl polyisocyanates such as 2,4-toluene diisocyanate, 2,6-toluene diisocyanate and 2,4,6-toluene triisocyanate, other phenyl polyisocyanates such as 1 - nitrophenyl - 3,5 - diisocyanate, diphenyl ether derivatives such as p-phenoxyphenyl isocyanate, 4,4'-diisocyanatodiphenyl ether and 3,3'-dichloro-4,4'-diisocyanatodiphenyl ether, diphenylmethane derivatives such as 4,4'-diisocyanatodiphenylmethane and 3,3'-dichloro-4,4' - diisocyanatodiphenylmethane, o - phenylphenylisocyanate, m-phenylphenyl isocyanate and p-phenylphenyl isocyanate, 1-naphthyl isocyanate, 4,4'-diphenyl diisocyanate, 2 - naphthyl isocyanate, 1,2,3,4 - tetrahydro - 2-naphthyl isocyanate, 7-methyl-1-naphthyl isocyanate, 2-methyl-1-naphthyl isocyanate, 4-methyl-1-naphthyl isocyanate, 2 - chloro - 1 - naphthyl isocyanate, 4 - chloro-1-naphthyl isocyanate, 7-chloro-1-naphthyl isocyanate, 8-chloro-1-naphthyl isocyanate, 4-chloro-2-methyl-1-naphthyl isocyanate, 2,4-dichloro-1-naphthyl isocyanate, 4,7-dichloro-1-naphthyl isocyanate, 5,7 - dichloro-1-naphthyl isocyanate, 5,8-dichloro-1-naphthyl isocyanate, the bromo derivatives corresponding to the above chloro compounds, 2-nitro-1-naphthyl isocyanate, 4-nitro-1-naphthyl isocyanate, 5-nitro-1-naphthyl isocyanate, 8-nitro-1-naphthyl isocyanate, 4-chloro-2-nitro-1-naphthyl isocyanate, 2,4-dinitro-1-naphthyl isocyanate, 4,5-dinitro-1-naphthyl isocyanate, 4,8-dinitro-1-naphthyl isocyanate, 1-chloro-2-naphthyl isocyanate, 5,8-dichloro-2-naphthyl isocyanate, 1,3,4 - trichloro - 2 - naphthyl isocyanate, 1,6-dichloro-2-naphthyl isocyanate, 1-nitro-2-naphthyl isocyanate, 5-nitro-2-naphthyl isocyanate, 6-bromo-1-nitro-2-naphthyl isocyanate, 1,5-dinitro-2-naphthyl isocyanate, 1,6-dinitro-2-naphthyl isocyanate, 1,8-dinitro-2-naphthyl isocyanate, 1-methyl-2-naphthyl isocyanate, 1,4-dimethyl-2-naphthyl isocyanate, 1-anthracene isocyanate, 2-anthracene isocyanate, 9-anthracene isocyanate, 2-phenanthrene isocyanate, 4-phenanthrene isocyanate, 9-phenanthrene isocyanate, 1,2-naphthalene diisocyanate, 4-chloro-1,2-naphthalene diisocyanate, 4 - methyl-1,2-naphthalene diisocyanate, 1,3-naphthalene diisocyanate, 1,4-naphthalene diisocyanate, 1,5-naphthalene diisocyanate, 1,6-naphthalene diisocyanate, 1,7-naphthalene diisocyanate, 1,8-naphthalene diisocyanate, 4-chloro-1,8-naphthalene diisocyanate, 2,3-naphthalene diisocyanate, 2,7-naphthalene diisocyanate, 1,8 - dinitro-2,7-naphthalene diisocyanate, 1-methyl-2,4-naphthalene diisocyanate, 1-methyl-5,7-naphthalene diisocyanate, 6 - methyl-1,3-naphthalene diisocyanate, 7-methyl-1,3-naphthalene diisocyanate, ethyl isocyanate, propyl isocyanate, butyl isocyanate, hexyl isocyanate, cyclopentyl isocyanate, 1,6-hexane diisocyanate, undecyl isocyanate, octadecyl isocyanate, cyclohexyl isocyanate, 1,10-decane diisocyanate, carboethoxymethyl isocyanate, 1,3-cyclohexane diisocyanate, 1,4-cyclohexane diisocyanate, allyl isocyanate, 3-chloro-1-propyl isocyanate, p-ethoxyphenyl isocyanate, 1,8-octane diisocyanate, 2-pyridine isocyanate, 2-quinoline isocyanate, and 1,12-dodecane diisocyanate.

The monoisocyanates above give monocarbodiimides while the polyisocyanates give polycarbodiimides (molecules containing more than one carbodiimide group, not polymers formed by the polymeriation of the carbodiimide group itself). The later can be allowed to polymerize to completion or, if desired, the molecular weight of the polymer can be controlled by adding an alcohol after a pre-determined amount of carbon dioxide has evolved to stop the growing polymer chains (see Smeltz, U.S. Patent 2,941,983).

The present invention is carried out by mixing the isocyanate, the catalyst and, optionally, the organic solvent free from Zerewitinoff active hydrogen under anhydrous conditions in a suitable reaction vessel and heating the mixture at from 100° C. to about 250° C. until the evolution of carbon dioxide ceases, in the case of monoisocyanates, or until a predetermined amount of carbon dioxide is released in the case of polyisocyanates. Although temperatures as low as 100° C. can be used, it is generally preferable to use temperatures in excess of 140° C. to reduce by-product formation. The solvent, if used, should have a boiling point at least as high as the desired reaction temperature. At lower temperatures, toluene can be used; at higher temperatures the xylenes or orthodichlorobenzene are suitable. The presence of a solvent makes isolation of the product somewhat simpler since fewer side reactions leading to tar formation occur and the product can be removed from the reaction vessel as a solution after cooling. Most of the carbodiimides are solids (the diphenyl and di-o-tolyl compounds are two exceptions) which requires removing them from the reaction vessel while hot if no solvent is used.

The following examples illustrate the invention with respect to operating conditions, types of catalysts and types of useful isocyanates. It is, of course, understood that these examples are meant to illustrate and not limit the invention. Parts are by weight unless otherwise indicated.

EXAMPLES

General procedure of carbodiimide preparation

The isocyanate, catalyst and solvent, if used, are placed in a dry reaction vessel equipped with an agitator, a dry nitrogen sweep, a reflux condenser and a means of determining the amount of carbon dioxide formed. On a small scale, weighing bulbs filled with a form of sodium hydroxide absorbed on asbestos are most convenient for this determination. On a larger scale, an automatic monitoring system which measures both the rate of formation and the total amount of carbon dioxide is used. The device uses a thermal conductivity cell and the necessary auxiliary electronic equipment to integrate the amount of carbon dioxide passing through the cell at any instant to the total quantity. The carbon dioxide measuring device is necessary when testing catalysts to determine the extent of reaction. When sufficient experience has been gained with a particular system of isocyanate and catalyst, it can be omitted.

The mixture of isocyanate, catalyst and the optional solvent is heated at a specific temperature until evolution of carbon dioxide reaches the desired extent. In some cases, the reaction was not carried to completion, it being merely established that carbodiimide was formed. The carbodiimides can, if monomeric, be isolated by distillation or other means of purification. Polymeric carbodiimides (i.e., those containing more than one carbodiimide group), due to their high molecular weight, can not be distilled and are usually not purified further than removing volatile materials. The presence of carbodiimide is readily determined by use of infrared spectroscopy; carbodiimides show a characteristic infrared peak (split) at 4.70–4.75 microns which is not subject to interference by either reactants or by-products. Thus, the presence of carbodiimide is readily established.

The results of a number of tests using the above procedure are shown in the accompanying tables.

TABLE I.—CATALYTIC ACTION OF AN ISOCYANATE TO FORM A CARBODIIMIDE

| Example | Catalyst | Moles | Isocyanate | Moles | Solvent | Moles | Reaction Temp., °C. | Reaction Time, hrs. | Percent Conversion ($CO_2$) |
|---|---|---|---|---|---|---|---|---|---|
| 1 | Ti(OCH($CH_3$)$_2$)$_4$ | 0.0023 | Phenyl | 0.2 | None | | 125-155 | 1 | |
| 2 | Ti(OCH($CH_3$)$_2$)$_4$ | 0.0075 | Cyclohexyl | 0.58 | ...do | | 100-102 | 4½ | 87 |
| 3 | Ti(OC$_4$H$_9$)$_4$ | 0.0059 | o-Tolyl | 0.518 | ...do | | 200-250 | 4½ | 68.6 |
| 4 | Ti(OC$_4$H$_9$)$_4$ | 0.0058 | ...do | 0.465 | Xylene | 0.571 | 137-150 | 19 | 21 |
| 5 | Ti(OCH$_2$CHC$_4$H$_9$)$_4$ | 0.0024 | ...do | 0.504 | ...do | 0.571 | 155-156 | 23½ | 71.3 |
|   | $\,\,$C$_2$H$_5$ | | | | | | | | |
| 6 | Zr(OC$_8$H$_{17}$)$_4$ | 0.0034 | ...do | 0.525 | ...do | 0.571 | 156-159 | 19 | 100 |
| 7 | Zr(OC$_8$H$_{17}$)$_4$ | 0.0034 | ...do | 0.485 | ...do | 0.571 | 155-162 | 26½ | 77.5 |
| 8 | Zr(OC$_8$H$_{17}$)$_4$ | 0.0017 | ...do | 0.516 | ODCB$^d$ | 0.463 | 200 | 6 | 82.6 |
| 9 | Zr(OC$_8$H$_{17}$)$_4$ | 0.0017 | ...do | 0.497 | ODCB | 0.442 | 181 | 4 | 95.2 |
| 10 | Zr(OC$_8$H$_{17}$)$_4$ | 0.0024 | p-Tolyl | 0.736 | ODCB | 0.680 | 150 | 18 | 68.5 |
| 11 | Zr(OC$_8$H$_{17}$)$_4$ | 0.0014 | ...do | 0.225 | ODCB | 0.205 | 175-180 | 19 | 96.3 |
| 12 | Zr(OC$_8$H$_{17}$)$_4$ | 0.0017 | p-Nitrophenyl | 0.465 | ODCB | 0.447 | 130-175 | 3 | 17 |
| 13 | Zr(OC$_8$H$_{17}$)$_4$ | 0.0045 | p-Chlorophenyl | 0.447 | ODCB | 0.447 | 179 | 4½ | 81.1 |
| 14 | Zr(OC$_8$H$_{17}$)$_4$ | 0.0017 | Phenyl | 0.413 | ODCB | 0.334 | 163 | 5½ | 46.5 |
| 15 | Zr(OC$_8$H$_{17}$)$_4$ | 0.0017 | Cyclohexyl | 0.202 | ODCB | 0.204 | 180 | 10 | 64.3 |
| 16 | Zr(OC$_8$H$_{17}$)$_4$ | 0.0019 | n-Octadecyl | 0.193 | ODCB | 0.193 | 175-182 | 24 | 33.6 |
| 17 | Zr(OC$_8$H$_{17}$)$_4$ | 0.0040 | MDI$^a$ | 0.200 | ODCB | 0.40 | 165-182 | 6 | 17.3 |
| 18 | Zr(OC$_8$H$_{17}$)$_4$ | 0.0059 | TDI$^b$ | 0.294 | ODCB | 1.40 | 183 | 12 | 18.7 |
| 19 | Zr(OC$_8$H$_{17}$)$_4$ | 0.0063 | TDI$^b$ | 0.275 | ODCB | 0.275 | 185 | 17 | 64.4 |
| 20 | Zr(OCH($CH_3$)$_2$)$_4$ | 0.0022 | o-Tolyl | 0.226 | ODCB | 0.204 | 180 | 4½ | 90.6 |
| 21 | NaOCH$_3$ | 0.0154 | ...do | 0.227 | ODCB | 0.358 | 170-180 | 6 | 20 |
| 22 | LiOC($CH_3$)$_3$ | 0.425 | Cyclohexyl | 4.90 | ODCB | 8.9 | 179 | 15.5 | 15.4 |
| 23 | LiOC($CH_3$)$_3$ | 0.475 | o-Tolyl | 4.27 | ODCB | 8.9 | 160 | 3 | 69.5 |
| 24 | Ti(OC$_6$H$_5$)$_4$ | 0.023 | ...do | 4.23 | ODCB | 8.9 | 180 | 23 | 78 |
| 25 | Ti(OC$_6$H$_4$OCH$_3$-p)$_4$ | 0.0035 | ...do | 4.28 | ODCB | 8.9 | 180 | 3 | 2 |
| 26 | Zr(OC$_8$H$_{17}$)$_4$ | 0.0112 | ...do | 4.27 | ODCB | 8.9 | 180 | 5½ | 85 |
| 27 | Zr(OC$_8$H$_{17}$)$_4$ | 0.024 | EtO$_2$CCH$_2$NCO | 4.27 | ODCB | 8.9 | 169-181 | 48 | 1.3 |
| 28 | Ti(OC$_2$H$_5$)$_4$ | 0.0024 | p-Tolyl | 0.746 | None | | 120 | 3 | (c) |
| 29 | Ti(OCH($CH_3$)$_2$)$_4$ | 0.0046 | ...do | 0.746 | ...do | | 120 | 3 | (c) |
| 30 | Ti(OCH($CH_3$)$_2$)$_4$ | 0.0046 | Cyclohexyl | 0.746 | ...do | | 120 | 3 | (c) |
| 31 | Zr(OC$_8$H$_{17}$)$_4$ | 0.0017 | 1-naphthyl | 0.168 | Xylene | 0.489 | 128-141 | 8 | 3.4 |
| 32 | Zr(OC$_8$H$_{17}$)$_4$ | 0.0017 | | 0.1063 | ODCB | 2.66 | 140 | 6 | 95 |

$$CH_3-\left[\begin{array}{c}\phantom{x}\\Cl\,\,\,\,CH_3\end{array}\bigcirc-NCO\right]_2$$

| 33 | Zr(OC$_8$H$_{17}$)$_4$ | 0.0017 | | | 0.1063 | ODCB | 0.585 | 140 | 3 | 84 |

$$O-\left[\bigcirc-NCO\right]_2$$

| 34 | Hf(OC$_8$H$_{17}$)$_4$ | 0.0015 | o-Tolyl | 0.342 | ODCB | 0.310 | 179 | 22 | 74.2 |
| 35 | Zr(OC$_8$H$_{17}$)$_4$ | 0.0031 | o-Methyoxyphenyl | 0.67 | None | | 180 | 12 | 86 |
| 36 | Nb(OC$_2$H$_5$)$_5$ | 0.0055 | o-Tolyl | 0.197 | ODCB | 0.311 | 175-190 | 2.8 | 71 |

$^a$ MDI=4,4′-diisocyanatodiphenylmethane.
$^b$ TDI=2,4-toluene diisocyanate.
$^c$ Not determined, product detected by infrared spectra.
$^d$ ODCB = Orthodichlorobenzene.

TABLE II.—RESULTS OF TABLE I REACTIONS

| Run | Product | Percent Yield | M.P., °C. | B.P. |
|---|---|---|---|---|
| 1 | Diphenylcarbodiimide | 73 | | 163°/11 mm. |
| 2 | Dicyclohexylcarbodiimide | 87 | | 154°/11 mm. |
| 3 | Di-o-tolylcarbodiimide | 68.6 | | 138°/0.9 mm. |
| 4 | ...do | 79.5 | | |
| 5 | ...do | 77.0 | | |
| 6 | ...do | 92.3 | | |
| 7 | ...do | 94.8 | | |
| 8 | ...do | 80.4 | | |
| 9 | ...do | 94.6 | | |
| 10 | Di-p-tolylcarbodiimide | 76 | 55 | |
| 11 | ...do | 98.6 | | |
| 12 | Di-p-nitrophenylcarbodiimide | (a) | 164-167 | |
| 13 | Di-p-chlorophenylcarbodiimide | 78.2 | Oil | |
| 14 | Diphenylcarbodiimide | (a) | | |
| 15 | Dicyclohexylcarbodiimide | 58 | | |
| 16 | Di-n-octadecylcarbodiimide | (a) | | |

See footnotes at end of table.

TABLE II—Continued

| Run | Product | Percent Yield | M.P., °C. | B.P. |
|---|---|---|---|---|
| 17 | Polymer | b100 | | |
| 18 | do | b100 | | |
| 19 | do | b100 | | |
| 20 | Di-o-tolylcarbodiimide | 69 | | |
| 21 | do | (a) | | |
| 22 | Dicyclohexylcarbodiimide | (a) | | |
| 23 | Di-o-tolylcarbodiimide | 62 | | |
| 24 | do | (a) | | |
| 25 | do | (a) | | |
| 26 | do | 91 | | |
| 27 | Dicarboethoxymethylcarbodiimide | (a) | | |
| 28 | Di-p-tolylcarbodiimide | (a) | | |
| 29 | do | (a) | | |
| 30 | Dicyclohexylcarbodiimide | (a) | | |
| 31 | Di-1-naphthylcarbodiimide | (a) | 93–95 | |
| 32 | Polymer | b100 | | |
| 33 | do | b100 | | |
| 34 | Di-o-tolylcarbodiimide | 72 | | |
| 35 | Di-o-methoxyphenylcarbodiimide | 97 | 73–75 | 180–180.2°/0.5 mm. |
| 36 | Di-o-tolylcarbodiimide | 80 | | | a Presence of product by infrared spectra, product not isolated quantitatively.
b Presence of carbodiimide groups shown by infrared spectra.

The following other carbodiimides have been prepared. Their physical properties are shown below.

TABLE III

| RN=C=NR R equals | M.P., °C. | B.P./mm., °C. |
|---|---|---|
| o-Chlorophenyl | | 143/0.3. |
| m-Tolyl | 118–119 | |
| Allyl | | 58–59/10. |
| 2-methyl-3-chlorophenyl | 64–66 | |
| o-Ethoxyphenyl | 98–99 | |
| n-Butyl | | 84–85/10. |
| Ethyl | | 24.5/11. |
| Isobutyl | | 72/10. |
| Isopropyl | | 160/atm. |
| n-Propyl | | 53/10. |
| 2-pyridyl | 137 | |
| 4-bromophenyl | | 202/10. |
| 2-bromophenyl | 98–100 | |
| 4-carboethoxyphenyl | 90 | |
| 2,4-dibromophenyl | 156–157 | |
| 2,5-dibromophenyl | 172–173 | |
| 4-diethylaminophenyl | 81–82 | |
| 4-dimethylaminophenyl | 89–90 | |
| 4-isobutylphenyl | 189 | |
| 2-naphthyl | 145–146 | |
| 4-n-propylphenyl | 168 | |
| tert. Butyl | | 140/atm. |
| 4-iodophenyl | 90 | |
| Phenyl | | 163/11. |
| Cyclohexyl | | |
| p-Nitrophenyl | 164–167 | |
| p-Chlorophenyl | Oil | |
| p-Tolyl | 55 | |
| 1-naphthyl | 93–95 | |

As many widely different embodiments of this invention may be made without departing from the spirit and scope thereof, it is to be understood that this invention is not limited to the specific embodiments thereof except as defined in the appended claims.

What is claimed is:

1. A process for preparing organic carbodiimides which comprises heating in a range of from about 100° C. to 250° C. under anhydrous conditions
   (A) an organic isocyanate containing 1 to 3 isocyanate groups and selected from the group consisting of carbocyclic aromatic isocyanates containing from one to three rings, saturated aliphatic isocyanates containing from two to eighteen carbons in the aliphatic group, pyridine isocyanates and quinoline isocyanates, said isocyanate being free of Zerewitinoff active hydrogen, and
   (B) an organometallic catalyst selected from the group consisting of tetraisopropyl titanate, tetrakis(2-ethylhexyl)titanate, tetraoctyl zirconate, tetraisopropyl zirconate and pentaethyl niobiate.

2. A process as described in claim 1 wherein said catalyst is selected from the group consisting of tetraoctyl zirconate and tetraisopropyl zirconate.

3. A process as described in claim 1 wherein said catalyst is tetraoctyl zirconate.

4. A process as described in claim 1 wherein said catalyst is pentaethyl niobiate.

5. A process as described in claim 1 wherein said catalyst is tetraisopropyl titanate.

6. Process as described in claim 1 wherein the catalyst is heated in o-dichlorobenzene.

7. A process as described in claim 1 wherein said catalyst is tetrakis(2-ethylhexyl)titanate.

8. A process as described in claim 1 wherein said catalyst is tetraisopropyl zirconate.

References Cited

UNITED STATES PATENTS

| | | | |
|---|---|---|---|
| 2,853,473 | 9/1958 | Campbell | 260—551 |
| 2,671,082 | 3/1954 | Stallmann | 260—248 XR |
| 2,683,144 | 7/1954 | Balon et al. | 260—248 XR |
| 2,853,518 | 9/1958 | Balon | 260—551 |
| 2,978,449 | 4/1961 | France et al. | 260—248 |
| 3,095,144 | 6/1963 | Spainhour | 260—248 |

FOREIGN PATENTS 856,372  12/1960  Great Britain.

OTHER REFERENCES

Bergmann: The Chemistry of Acetylene and Related Compounds, p. 80 (1948).

Smolin et al.: "s-Triazines and Derivatives," pages 410–411, Interscience Publishers, Inc., New York (1959).

Khorana: Chemical Reviews, vol. 53, page 151 (1953).

JOHN D. RANDOLPH, Primary Examiner.

U.S. Cl. X.R.

260—248, 453, 77.5, 551, 296, 239, 465.5